United States Patent [19]

Dovan et al.

[11] Patent Number: 4,534,412

[45] Date of Patent: Aug. 13, 1985

[54] CONTINUOUS PERMEABILITY REDUCTION IN SUBTERRANEAN RESERVOIRS

[75] Inventors: Hoai T. Dovan, Brea; Richard D. Hutchins, Placentia, both of Calif.

[73] Assignee: Union Oil Company of California, Los Angeles, Calif.

[21] Appl. No.: 559,920

[22] Filed: Dec. 9, 1983

[51] Int. Cl.$^3$ ............................................ E21B 33/138
[52] U.S. Cl. .................................... 166/295; 166/294; 166/300; 523/130
[58] Field of Search ............... 166/270, 294, 295, 300; 523/130

[56] References Cited

U.S. PATENT DOCUMENTS

| | | | |
|---|---|---|---|
| 3,421,584 | 1/1969 | Eilers et al. | 523/130 X |
| 3,687,200 | 8/1972 | Routson | 166/275 |
| 3,740,360 | 6/1973 | Nimerick | 166/295 X |
| 3,762,476 | 10/1973 | Gall | 166/294 |
| 3,825,067 | 7/1974 | Vestal | 166/275 |
| 3,841,399 | 10/1974 | Ryan | 166/270 X |
| 4,009,755 | 3/1977 | Sandiford | 166/270 |
| 4,015,995 | 4/1977 | Hess | 166/295 X |
| 4,043,922 | 8/1977 | Palmer et al. | 166/274 X |
| 4,069,869 | 1/1978 | Sandiford | 166/270 |
| 4,413,680 | 11/1983 | Sandiford et al. | 166/270 |

*Primary Examiner*—George A. Suchfield
*Attorney, Agent, or Firm*—June M. Bostich; Gregory F. Wirzbicki; Dean Sandford

[57] ABSTRACT

A method for selectively reducing the permeability of the higher permeability zones of a subterranean reservoir having heterogeneous permeability, such permeability reduction extending continuously from nearby the well as far into the reservoir as is desired. There is injected into the reservoir an aqueous solution or solutions of a water-soluble polymer, a material capable under certain conditions of at least partially cross-linking the polymer to form a gelatinous precipitate, a water-soluble alkaline material in an amount sufficient to maintain the pH of the polymer-containing composition above the pH at which cross-linking occurs until the composition has passed a desired distance through the reservoir, and a temperature-activated water-soluble acidic material dissolved in the aqueous solution in an amount sufficient to lower the pH of the overall solution to the pH at which cross-linking occurs when said solution is subjected to an elevated temperature. A continuous gelatinous plug is formed which extends from the immediate vicinity of the well to a point as close to the well as about 20 feet, when it is desired to plug a feature of the strata which extends only a short distance therein, or as far into the well as is desired, for example up to 200 feet, when it is desired to plug an extensive zone of high permeability.

48 Claims, No Drawings

CONTINUOUS PERMEABILITY REDUCTION IN SUBTERRANEAN RESERVOIRS

BACKGROUND OF THE INVENTION

1. Field of the Invention

This invention relates to a method for reducing the permeability of the more permeable zones of a subterranean reservoir having nonuniform permeability, and more particularly, to such a method wherein the elevated temperature encountered in the reservoir causes permeability reduction to occur after an injected composition or compositions have passed radially into the reservoir only a short distance from the well so that continuous permeability reduction is effected from nearby the well extending into a more permeable zone a substantial distance.

2. Description of the Prior Art

It has long been recognized that when fluids are passed through a subterranean reservoir having heterogeneous permeability, for example during an enhanced recovery process or during production of fluids from a well, a relatively higher volume of fluids tends to pass through the more permeable strata with little or no fluid passing through the less permeable strata.

It is known to attempt to even out the flow of fluids through such reservoirs, for example, to increase the proportion of the fluids flowing through the less permeable portions of the reservoir, by injecting into the reservoir a fluid which predominantly enters the more permeable strata where it subsequently thickens and/or at least partially sets to reduce the permeability of these more permeable zones and in some cases to plug them completely. As a result, a higher proportion of any fluid subsequently passed through the reservoir will flow through the portions of the reservoir which originally were less permeable.

Among the more recent fluids which have been used to reduce permeability or plug more permeable strata in a reservoir are aqueous solutions or dispersions of a polymer containing a cross-linking agent. For example, U.S. Pat. Nos. 4,009,755 and 4,069,869 to Sandiford each deals with forming plugs in wells wherein there are injected various combinations of: (a) an aqueous solution of a water-soluble polymer, such as polyacrylamide, (b) a cross-linking material that reacts with the polymer to form a polymer-containing plug, such as a compound of a multivalent metal and a reducing agent, a low molecular weight water-soluble aldehyde, or a colloidal hydroxide of a multivalent cation, (c) an aqueous solution of an alkali metal silicate and (d) a gelling agent that reacts with the silicate to form a silicate-containing plug, for example, acid and acid-forming compounds, water-soluble ammonium salts, lower aldehydes and aluminates. In the compositions described in each of these references, a large amount of alkali metal silicate is present, and this material becomes a part of the plug.

U.S. Pat. No. 3,687,200 to Routson describes a method for controlling the flow of aqueous fluids in a porous subterranean formation using an aqueous colloidal dispersion of a water-soluble inorganic compound, such as aluminum hydroxide, prepared in an aqueous solution of a synthetic organic polymeric polyelectrolyte, for example, a polyacrylamide, without a cross-linking agent. In one method of preparing the dispersion, a small amount of an alkali metal hydroxide or an alkaline buffer is dissolved in the polymer solution. Thereafter, a dilute solution of a suitable metallic salt, such as a soluble salt of aluminum, is added to the polymer solution to precipitate aluminum hydroxide in the form of a stable colloidal dispersion of the insoluble aluminum hydroxide. The resulting composition causes a high pressure drop when forced through a permeable core. An alternative method of preparing the dispersion involves addition of a precipitant such as sodium sulfide to the composition instead of the alkali metal hydroxide. In yet another method applicable in certain cases, the composition containing the colloidal dispersion is generated inside a subterranean formation. Specifically, if the connate water contains soluble sulfide ions, a solution of a metallic salt in an aqueous solution of polymer is injected to form the colloidal insoluble metallic sulfide in the interstices of the formation. Otherwise, the dispersion plugging agent is produced before the composition is injected into the formation, thereby promoting plugging at the well sidewall and in the immediate vicinity of the well rather than in the formation a substantial distance from the well.

U.S. Pat. No. 3,841,399 to Ryan describes forming in situ a polymer-thickened aqueous waterflooding composition by injecting into a formation a low viscosity, potentially hydrolyzable, synthetic aqueous emulsion polymer, such as a water dispersion of acrylonitrile copolymerized with ethyl acrylate, and an aqueous solution of sodium hydroxide. The polymer is eventually hydrolyzed in the subterranean formation to form a high viscosity composition. The caustic solution can be added in admixture with the polymer compositions or separately following the polymer composition. No cross-linking agent is employed.

U.S. Pat. No. 3,825,067 to Vestal describes a method for dissolving a polyacrylamide polymer in water to form a composition useful as a secondary recovery drive fluid. The powdered polymer is mixed with dilution water, the pH is adjusted to between 7 and 14 by the addition of a base such as sodium hydroxide or trisodium phosphate, and the resulting solution is heated to simultaneously hydrolyze and solubilize the polymer. No cross-linking agent is utilized. The composition does not form a plug in the reservoir or otherwise alter reservoir permeability, but rather functions as a drive fluid to displace oil from the reservoir.

While each of the aforementioned treatments has met with some success in particular applications, the need exists for a further improved well treating process to selectively reduce the permeability of the more permeable strata of a reservoir having heterogeneous permeability, especially in the immediate vicinity of a well penetrating such strata and extending continuously into the formation as far as is desired. Moreover the prior art processes often encounter practical difficulties. For example, in those processes employing a polymer and cross-linking agent, if the two materials are mixed together in an aqueous solution at the surface, they tend to initiate reaction immediately. By the time the resulting composition is pumped down a well and into a reservoir, the composition often has already begun to increase in viscosity and may be difficult to force into even the higher permeability strata. The same is true to a lesser extent if separate aqueous solutions of polymer and cross-linking agents are simultaneously pumped down a well and mix as they pass through the tubing. On the other hand, if one of the compositions is pumped first followed by the second, there is less chance of reaction occurring until after the compositions have entered the reservoir. However, mixing in a reservoir of separately injected compositions is difficult to control. And if the composition is premixed but contains an alkaline ingredient intended to delay the cross-linking reaction until the pH is lowered by contact of the fluid with the reservoir, the plug does not form until the fluid has passed some distance from the well into the reservoir. What is desired, therefore, is a composition capable of reducing permeability that can be injected down a well and into a reservoir as a low viscosity, easily-pumped liquid and which reacts after injection at a rate highly accelerated by the elevated temperature encountered within the formation of the reservoir to form a viscous, permeability-reducing composition or plug in the immediate vicinity of the wellbore, preferably the temperature-activated composition being used to form a continuous gelatinous plug extending from nearby the well as far into the reservoir as is desired.

Accordingly, it is a principal object of the invention to provide a method for reducing the permeability to fluids of the more permeable strata of a reservoir having heterogeneous permeability in the immediate vicinity of the wellbore.

It is a further object of this invention to provide a method wherein the permeability reduction occurs nearby or in the immediate vicinity of a well penetrating such reservoir and extends into the reservoir as far as is desired.

It is a still further object of this invention to provide such a method wherein the permeability reduction is achieved near to the well by injecting into the reservoir via a well a relatively low viscosity aqueous base composition which reacts at reservoir temperature to form a relatively high viscosity composition and/or plug after passing into the reservoir.

An additional object of this invention is to provide a method of continuous injection whereby a substantially continuous plug can be formed between two impermeable strata extending from nearby the well into the reservoir as far as may be desired.

Another object of this invention is to provide such a method wherein the point of the onset of permeability reduction and the extent of plug formation in a reservoir can be controlled.

Other objects, advantages and features of the invention will be apparent from the following description and claims.

SUMMARY OF THE INVENTION

Briefly, the invention provides a method for reducing the permeability of the higher permeability zones of a subterranean reservoir having heterogeneous permeability, wherein there is injected into the reservoir via the well an aqueous liquid comprising a water-soluble or water-dispersible polymer, a material reactive for at least partially cross-linking the polymer to form a gelatinous precipitate, a source of hydroxyl ions, such as a water-soluble alkaline material, in an amount and concentration sufficient to retard crosslinking, and a temperature-activated water-soluble acidic material dissolved in the aqueous solution capable of accelerating pH reduction of the solution at an elevated temperature so as to either initiate or accelerate crosslinking reactions at said elevated temperature, for example, at about 150° F., or the temperature encountered within the reservoir. By this method, a continuous plug can be formed which extends from nearby the well only a short distance, for example, about 20 feet when it is desired to plug a shallow zone of high permeability, or as far as about 200 feet or more, when it is desired to plug an extensive zone of high permeability.

Due to its wetting characteristic, the solutions injected in the method of this invention preferentially pass into those strata having higher water permeabilities. The gels or solid precipitates which are formed in the higher permeability zones cause them to become at least partially plugged. As the permeability of the most permeable zone is reduced, the injected solution tends to pass to a greater extent into the next most permeable zone causing permeability reduction therein. As a consequence, a reservoir containing strata or zones of nonuniform permeability with respect to water is rendered more uniformly permeable.

The permeability control technique of this invention is particularly useful in conjunction with enhanced recovery processes, such as a waterflood or steam drive, wherein the permeability adjusting treatment can be periodically performed as necessary to achieve the desired uniformity. In another embodiment of the invention, the aforementioned permeability-reducing solution is injected into a producing well in order to plug the permeable water channels in communication therewith.

DETAILED DESCRIPTION OF THE INVENTION

The present invention provides a method for reducing the permeability or for plugging of the more permeable zones of a subterranean reservoir having heterogeneous permeability. According to the invention, there is injected into the reservoir an aqueous solution or solutions comprising (a) a water-soluble or water-dispersible polymer, (b) a material capable of at least partially cross-linking the polymer at a pH of about 10 or below to form a gelatinous precipitate, (c) a compound that will produce hydroxyl ions in aqueous solution, for example, a water-soluble alkaline material in an amount and concentration sufficient to raise the pH of the polymer-containing composition above about 10, and (d) an additive comprising a water-soluble temperature-activated acidic material capable of rapidly producing hydrogen ions in aqueous solution at elevated temperatures, such as those encountered within oil-producing reservoirs, for example, up to about 200° or 300° F. Typically, an amount of the acidic material sufficient to lower the pH of the polymer containing composition below about 10 at a temperature of 150° F. or other expected reservoir temperature is dissolved in the aqueous phase of the solution.

In one embodiment of this invention, the aqueous solution containing the temperature-activated acidic material capable of rapidly lowering the pH of the overall solution is used to plug a shallow zone of high permeability extending from the well for a distance of up to about 20 feet or less. To form a continuous plug extending from nearby the well into the formation a distance of only about 20 feet or less, the concentration of the acidic component is usually maintained at a constant level during injection.

More usually, it is desired to form a continuous plug extending from nearby the well into the reservoir a substantial distance, for example, as far as 200 feet or more, to reduce permeability in an extensive zone of high permeability, especially in a zone of high permeability confined between two impermeable strata. Three alternative embodiments of the process of this invention are contemplated for accomplishing this objective. Hereinafter described are methods employing a two-stage, a multi-stage or a continuous injection operation in which the amounts of the components in the aqueous solution are adjusted so as to facilitate formation of a continuous plug by ensuring agglutination of each increment of injected polymer solution at points successively nearer the well.

More particularly, when the two-stage injection method of this invention is used, during the first stage of injection gelation of the polymer is accomplished in that portion of the permeability zone extending between about 20 and 200 feet from the well while gelation in that portion extending between the well and about 20 feet therefrom is accomplished during the second stage of injection. As a result a continuous gelatinous plug is formed which extends from nearby the well to any desired distance, typically about 200 feet. In this embodiment of the invention, the aqueous solution does not contain the temperature-activated additive during the first stage of injection, so that cross-linking results with this solution by a decrease in the pH of the composition caused by dilution with reservoir fluids, which usually have a pH below about 9, or by reaction of the alkaline material with the reservoir or by the alkaline material forming deposits on the reservoir rock with which it comes into contact. The decrease in pH requisite for the onset of cross-linking occurs slowly in the absence of the acidic material so that the gelatinous plug formed as the result of the first stage of injection usually extends from a distance about 20 feet from the well to any desired distance, usually depending upon the amount of alkaline material in the injection fluid and the conditions within the reservoir. The well can be shut in after the first stage of injection until an increase in injection pressure signifies that a decrease in permeability has occurred before commencing the second stage of injection, or the second stage of injection can commence at once.

During the second stage of injection, it is desired to decrease pH rapidly, preferably upon entry of the solution into the reservoir to accomplish rapid gelation. The polymer-containing solution is used in combination with a temperature-activated acidic material, the additive being dissolved in the aqueous solution before injection so that temperature-activated cross-linking takes place nearby the well, usually in only about the first 20-foot portion of an injection zone extending radially from the well into the reservoir. As the composition containing the temperature-activated acidic material enters the reservoir, the pH of the composition falls relatively rapidly due to the release of hydrogen ions triggered by the elevated temperature encountered in the reservoir. The temperature-activated acidic material therefore initiates cross-linking to form a plug near the well, usually within about 20 feet of the well, which joins the plug formed by the first stage injection. The two stage injection operation, therefore, forms a continuous plug extending from nearby the well as far as is desired.

The composition and methods for use of this invention are especially effective for reducing permeability in highly permeable injection zones situated between two impermeable strata. In such formations, it is highly desirable to form a substantially continuous plug extending from nearby the well into the reservoir up to about 200 feet. Formation of an extensive continuous plug maximizes utilization of the polymer and cross-linking materials by leaving little of the polymer-containing fluid ungelled. In addition, chance of the plug becoming dislodged by the pressure of subsequently injected fluids, as during an enhanced recovery process, is minimized when the plug extends from the well into the reservoir a substantial distance. The distance from the well to which the plug extends can be controlled by varying the pH of the first-injected polymer-containing fluid, the higher the pH, the farther out into the reservoir the plug will eventually extend.

In the preferred embodiment, the fluids are administered continuously or in several slugs injected in multi-stages, with each slug containing concentrations of polymer, cross-linking agent, alkaline material, and acidic material adjusted so that the pH of the injection fluid is continuously decreased to compensate for the fact that each successive slug or increment of fluid will travel a shorter distance into the formation and thus contact and react less with the components of the reservoir and so that the amount of acid available is increased to cause cross-linking of each slug at points progressively nearer the well. In this manner, cross-linking of the entire fluid is assured at all points from near the well out to the desired distance. For multi-stage injection a typical schedule of injection administered in five slugs uses the concentrations of components in the following ranges:

| Slug No. | Polymer (ppmw) | Aluminum Ion (ppmw) | Alkaline Component (ppmw) | Acidic Component (ppmw) |
| --- | --- | --- | --- | --- |
| 1 | 1500–2500 | 100–200 | 750–1000 | 0.01–10 |
| 2 | 1500–2500 | 95–150 | 700–850 | 80–120 |
| 3 | 1500–2500 | 95–150 | 650–750 | 400–3000 |
| 4 | 1500–2500 | 95–150 | 600–700 | 4500–5500 |
| 5 | 1500–4000 | 95–150 | 500–600 | 6000–12000 |

In both multi-stage and continuous injection, operation is commenced with an injection fluid having an initially high concentration of the cross-linking agent, which is then decreased from the initial concentration, typically and preferably to a constant value. Meanwhile, the concentration of the alkaline material decreases and that of the acidic material increases with each successive increment of solution, with the concentration of the acidic material usually being at a relatively low value initially. Usually the pH of the first injected fluid is above about 10, preferably between 10 and 12, and the pH of the last injected fluid is above about 9.2, and preferably between about 9.2 and 9.8. The concentration of acidic material in the first-injected solution is typically below about 400 ppmw and preferably below about 10 ppmw while the concentration of the acidic material in the last-injected solution is above about 4500 and preferably above about 6000 ppmw. The fluid injected between the first and last stages (in the case of multi-stage operation) and between the first and last portion or increment (in the case of continuous operation) has a pH which gradually diminishes and an acid concentration which gradually increases.

The reason the pH of the injection fluid is progressively decreased during multi-stage or continuous operation relates to the chemistry of the reservoir formation. During the course of injection, the components in the reservoir formation capable of lowering the pH of aqueous liquids are progressively diminished by reaction with the alkaline injection fluid. Continuously decreasing the pH of the injection fluid during injection compensates for this effect and the economy and efficiency of the permeability-reducing treatment is considerably improved.

The aqueous polymer solution employed in this invention is a dilute solution or dispersion of a water-soluble or water-dispersible polymer in an aqueous medium, such as fresh water or brine, whose onset of gelation can be controlled by the amounts of alkaline and temperature activated acidic material contained therein. One aqueous medium contemplated for use in the invention is connate water withdrawn from the reservoir having a temperature substantially elevated above ambient temperature. Care should be taken that the temperature of the connate water into which the polymer, cross-linking agent, alkali, and acidic material are added is sufficiently below that at which gelation of the injection fluid will occur to avoid gelation before the treating fluid can be positioned into the reservoir. Usually the treating fluid should be injected at a temperature at least about 25° to 50° F. below the temperature of the reservoir.

A number of water-soluble polymers are known to form viscous aqueous polymer solutions when dissolved in relatively dilute concentrations. Exemplary water-soluble polymeric materials that can be employed in this invention are relatively high molecular weight acrylic acid-acrylamide copolymers, polyacrylamides, partially hydrolyzed polyacrylamides, polyalkyleneoxides, ammonium or alkali metal salts of carboxyalkylcelluloses, carboxyalkylhydroxyethyl celluloses, hydroxyethylcelluloses and heteropolysaccharides obtained by the fermentation of starch-derived sugar.

Many of the water-soluble polymers useful in the practice of this invention are characterized by a viscosity of at least 3 centipoises for a 0.1 parts by weight solution thereof in an aqueous 3 parts by weight sodium chloride solution at 25° C. as determined with a Brookfield viscometer equipped with a UL adapter and operated at a speed of 6 r.p.m. However, it is to be recognized that other of the water-soluble polymers such as certain polyacrylamides and polyalkyleneoxides, are effective in reducing the mobility of water in porous media, yet have little or only slight effect upon the viscosity of water or brine.

The polyacrylamide and partially hydrolyzed polyacrylamide which can be used in this invention include the commercially available, water-soluble, high molecular weight polymers having molecular weights of above about $0.2 \times 10^6$, preferably from $0.5 \times 10^6$ to $40 \times 10^6$, and more preferably from $3 \times 10^6$ to $20 \times 10^6$. The hydrolyzed polyacrylamides have up to about 70 percent of the carboxamide groups originally present in the polyacrylamide hydrolyzed to carboxyl groups. Preferably from about 12 to about 45 percent of the carboxamide groups are hydrolyzed to carboxyl groups. Hydrolysis of the acrylamide polymer is accomplished by reacting the same with sufficient aqueous alkali, for example, sodium hydroxide, to hydrolyze the desired number of amide groups present in the polymer molecule. The resulting products consist of a long hydrocarbon chain, with some carbon atoms bearing either amide or carboxyl groups. Copolymerization of acrylic acid and acrylamide according to well known procedures produces acrylic acid-acrylamide copolymers. The term "hydrolyzed polyacrylamide," as employed herein, is inclusive of the modified polymers wherein the carboxyl groups are in the acid form and also of such polymers wherein the carboxyl groups are in the salt form, provided that the salts are water-soluble. Alkali metal and ammonium salts are preferred. A number of polyacrylamides, partially hydrolyzed acrylamide polymers and acrylic acid-acrylamide copolymers suitable for use in this invention are commercially available; for example, WC-500 polymer marketed by Calgon Corporation of Pittsburg, Pa., Pusher 700 polymer marketed by The Dow Chemical Company of Midland, Mich., Q-41-F polymer marketed by Nalco Chemical Company of Oak Brook, Ill. and Cyanatrol 940 polymer marketed by American Cyanamid of Wallingford, Conn.

Especially useful in the practice of this invention are the partially cationic polyacrylamides, the partially anionic polyacrylamides, and mixtures thereof. A partially cationic polyacrylamide is a nonionic polyacrylamide which contains a cationic comonomer, such as an alkylene polyamine, a quaternary ammonium chloride or amine hydrochloride, for example trimethyl octyl ammonium chloride, trimethyl stearyl ammonium chloride, oleyl trimethyl ammonium chloride, oleyl amine diethylamine hydrochloride and dimethylaminopropylamine. A partially anionic polyacrylamide can be generated by partially hydrolyzing a nonionic polyacrylamide to convert some of the acrylamide groups to acrylic groups, the alkali metal salts of which are anionic. Introducing sulfate or sulfonate groups into the polyacrylamide molecule also imparts an anionic character to the molecule. Polymer 1160 is a 20 percent by weight cationic, 80 percent nonionic copolymer marketed by Betz Laboratories, Inc. of Trevose, Pa. Polymer 1120 and Hi Vis polymer are 35 percent anionic, 65 percent nonionic polyacrylamides which have been partially hydrolyzed to the extent of 35 percent. These polymers are also marketed by Betz Laboratories, Inc.

The typical polyalkeneoxides employed in the invention have molecular weights in the range of from about $10^6$ to $10^8$, preferably from $10^6$ to $10^7$ and most preferably from $3 \times 10^6$ to $10 \times 10^6$. By "polyalkeneoxide" is meant herein any of the polymeric water-soluble resins prepared by homopolymerization of a single alkene oxide, for example ethylene oxide, propylene oxide or butylene oxide. It is preferred to employ the homopolymer of polyethylene oxide. This product is marketed by Union Carbide Corporation under the trademark "Polyox." Mixed polyalkeneoxides, made by heteropolymerization of more than one alkene oxide in either a random or block polymerization, may also be employed.

Also suitable for use in this invention are the alkali metal or ammonium salts of a carboxyalkylcellulose, such as carboxymethylcellulose. Carboxymethylcellulose may be represented by the formula:

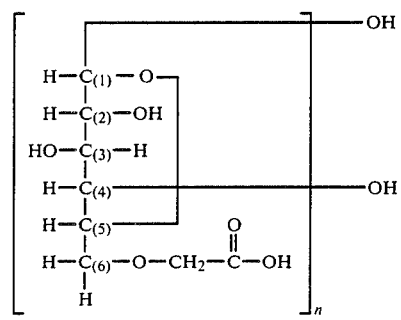

where n is a whole number greater than one, and the carboxymethyl anhydroglucose units are connected together by oxygen bridges between carbon atom (1) of one unit and carbon atom (4) of another unit. A salt of carboxymethylcellulose is carboxymethylcellulose wherein the hydrogenation at the end of the carboxymethyl group in one or more of the carboxymethyl and anhydroglucose units is replaced by a cation. In any molecule or group of molecules of carboxymethylcellulose, each anhydroglucose unit need not necessarily contain a carboxymethyl group although one or more anhydroglucose units may contain up to three carboxymethyl groups, the additional carboxymethyl groups being substituted for the H's of the OH groups on carbon atoms (2) and (3). As used herein, the term "carboxymethylcellulose" is defined as any carboxymethylcellulose having a degree of substitution less than one wherein the number of anhydroglucose units exceeds the number of carboxymethyl groups. Commercial grades of carboxymethylcellulose have a degree of substitution ordinarily between 0.5 to 0.9.

Hydroxyethylcellulose can be prepared from shredded wood pulp which has been soaked in 30 weight percent sodium hydroxide solution for about 20 hours. The resultant alkali cellulose is reacted with either ethylene oxide or ethylene chlorohydrin until a sufficient number of ethylene groups per glucose unit has been combined. The water-soluble form of hydroxyethylcellulose useful in this invention has a substitution (hydroxyethyl groups per glucose unit) greater than about 0.5, and preferably from 1.0 to 2.0. This is in contrast to the alkali-soluble form of hydroxyethylcellulose which has a substitution less than about 0.3. Generally, about 4 to 5 hours are required at about 40° C. for complete reaction of the alkali cellulose with the ethylene compound to produce a water-soluble hydroxyethylcellulose. The product is available commercially as either a solid fibrous material or in the form of aqueous solutions having up to about 10 weight percent hydroxyethylcellulose and a viscosity in the range of about 10 to 1200 centipoises. A very high molecular weight hydroxyethylcellulose suitable for use in this invention is marketed by Hercules, Inc. under the trademark Natrosol 250. Another suitable hydroxyethylcellulose is marketed by the Union Carbide Corporation under the trademark Cellosize.

A particularly useful water-soluble cellulose ether is carboxymethylhydroxyethylcellulose, CMHEC, in which part of the carboxymethyl groups of carboxymethylcellulose are replaced with hydroxyethyl groups following well-known procedures. It is preferred that the carboxymethyl degree of substitution be at least 0.4. The degree of hydroxyethyl substitution is less important and can vary widely, for example, from about 0.1 to 0.4 or higher. A suitable CMHEC is marketed by Hercules, Inc. under the trademark SPX 5338.

The heteropolysaccharides which may be used in carrying out the present invention are ionic polysaccharides produced by fermentation of carbohydrates by bacteria of the genus Xanthomonas. Examples of such heteropolysaccharides are those produced by *Xanthomonas campestris, Xanthomonas begonia, Xanthomonas phaseoli, Xanthomonas hederae, Xanthomonas incanae, Xanthomonas carotae* and *Xanthomonas translucens.* Of these, ionic polysaccharide B-1459 is preferred. The polysaccharide B-1459 is prepared by culturing the bacterium *Xanthomonas campestris* NRRL B-1459, United States Department of Agriculture, on a well-aerated medium containing commercial glucose, organic nitrogen sources, dipotassium hydrogen phosphate and various trace elements. Fermentation is carried to completion in four days or less at a pH of about 7 and a temperature of 28° C. Polysaccharide B-1459 is available under the trademark Kelzan MF marketed by Kelco Company of San Diego, Calif. Production of this heteropolysaccharide is well described in Smiley, K. L. "Microbial Polysaccharides-A Review", *Food Technology* 20, 9:112–116 (1966) and Moraine, R. A.; Rogovin, S. P.; and Smiley, K. L., "Kinetics of Polysaccharide B-1459 Synthesis", *J. Fermentation Technology* 44, 311–312 (1966).

The selected water-soluble polymer is admixed with water or brine to provide a relatively dilute aqueous solution of the polymer that exhibits a sufficiently reduced mobility when injected into the porous media to divert subsequently injected fluids to the less permeable channels. Preferably, the polymer is dissolved in fresh water since the mobility reduction effect of most of these polymers is inhibited by the presence of substantial quantities of dissolved salts. However, it is sometimes desirable to employ oil-field brine or other water containing relatively high dissolved salt contents, particularly where the reservoir into which it is to be injected is water-sensitive or where fresh water is not available. In most instances, the mobility of the water can be reduced to the desired level by the addition of about 0.0025 to about 1 part by weight of the polymer, and satisfactory results can often be obtained by the addition of 0.02 to 0.5 part by weight of polymer.

Materials which react with the polymer to produce a polymer-containing plug are those which at least partially cross-link the polymer to form a gelatinous precipitate. Suitable cross-linking agents used in an amount sufficient to promote cross-linking of the polymer are an alkali metal or ammonium aluminate, tungstate or gallate. Exemplary materials include sodium aluminate, potassium aluminate, ammonium aluminate, sodium tungstate, potassium tungstate and ammonium tungstate, with sodium aluminate being preferred. Broadly, the amount of cross-linking agent to be used can range from about 0.0005 to 1 part by weight of the aqueous solution or dispersion. Preferably, about 0.003 to 0.2 part by weight of the aqueous solution or dispersion is employed.

By careful selection of particular polymers and cross-linking agents, the cross-linking reaction can be somewhat delayed; however, in most instances, the cross-linking reaction tends to start as soon as the components are mixed. Where such solutions are to be used as part of a well treating process, it would be highly desirable if the cross-linking reaction could be delayed so that the solution would not substantially increase in viscosity until the solution had been prepared on the surface, pumped down a well, and pumped out into the reservoir as far as the plug is desired to extend. If the onset of crosslinking is not delayed, fluid pumped into the reservoir can begin to gel in the wellstream or before it has passed a sufficient distance into the reservoir so that only a small volume of permeability reducing composition is used and it is relatively easy for subsequently injected fluids to bypass the portions of the reservoir containing the permeability reducing composition, and the desired permeability control in the reservoir may be lost. On the other hand, if onset of cross-linking is delayed to prevent gelation before the fluid has been pumped into the reservoir as far as the plug is desired to extend, the portion of the last-injected fluid which remains nearest the well usually will not be sufficiently exposed to the pH-reducing effect of the reservoir to gel. The result will be failure to plug a portion of the zone of high permeability in the immediate vicinity of the well, usually within about 20 feet of the well.

It would be highly desirable if the permeability reduction could be achieved in the reservoir so as to extend from the immediate vicinity of the well to a distance of about 100 feet or beyond, for example, about 100 to 200 feet from a well. Control of the point at which permeability reduction begins and the point to which it extends can be achieved by progressively adjusting the relative amounts of alkaline and acidic materials so that gelation occurs at all points from near the well to the desired distance. However, care must be taken not to decrease the amount of alkaline material in the permeability-reducing composition below that needed to delay cross-linking while the solution is being prepared and pumped down the well.

An aqueous solution of a water-soluble or water-dispersible polymer and a cross-linking agent has a typical pH from about 8.7 to 9.25. It has been found that if the pH of such a solution is raised to about 9 or above, more particularly, 10 or above, as by the addition of a water-soluble alkaline material, no cross-linking reaction occurs even 30 or more days after mixing. A sufficient concentration of the water-soluble alkaline material in the polymer solution, therefore, will delay the cross-linking reaction while the solution is being pumped into the well and a desired distance into the formation. The water-soluble alkaline material may comprise any compound which releases hydroxyl ions in aqueous solution, i.e., a hydroxyl ion precursor, and is usually selected from the group consisting of alkali metal and ammonium hydroxides, alkali metal silicates, alkali metal and ammonium carbonates and alkali metal phosphates. Sodium hydroxide is the preferred hydroxide, and sodium carbonate is the preferred carbonate. Water-soluble alkali metal silicates may also be employed as the alkaline material, although in many embodiments of the invention no silicates or essentially no silicates are present in the alkaline material or in the injection fluid. If a silicate is used, sodium silicate is the most commonly employed alkali metal silicate. Any sodium silicate having a ratio of silica to sodium oxide of from about 1.5:1 to 4:1 by weight can be used. Preferably, the ratio should be from about 3:1 to 3.5:1. Examples of alkali metal phosphates which can be used include monobasic sodium phosphate, dibasic sodium phosphate and trisodium phosphate. Preferably, the alkaline material is employed in a concentration of about 0.025 to 0.5 part by weight of the aqueous solution or dispersion, with the amount of alkaline material added being sufficient to provide a pH above 9.0, usually above 9.2, and preferably above 10.0, so that cross-linking reactions between the polymer and cross-linking agent are retarded and preferably eliminated.

The water-soluble, temperature-activated acidic material releases hydrogen ions rapidly in aqueous solution at reservoir temperatures and may be selected from the group consisting of polyethylene glycol esters, ethyl acetate esters, acrylate copolymers and dimethyl esters. The preferred acidic material is a mixture in any proportions of dimethyl glutarate, dimethyl adipate and dimethyl succinate which hydrolyzes readily at about 150 degrees Fahrenheit. Most preferably, the mixture of dimethyl esters contains about 10 to 25 percent of dimethyl adipate, about 45 to 65 percent of dimethyl glutarate and about 20 to 30 percent dimethyl succinate by weight. The acidic material is usually employed in a concentration of about 0.05 to about 20 parts by weight and preferably in a concentration of about 0.6 to about 1.2 parts by weight.

As the composition containing the acidic component is pumped into the well and enters the reservoir, the increasing temperatures encountered therein rapidly accelerate the rate at which the hydrolysis reaction releases hydrogen ions so that, despite the action of the alkaline material to maintain the solution at a high pH, the pH of the solution falls at a rate substantially determined by the concentration of the acidic component in the solution and the temperature of the subterranean formation. Since the effect of increasing temperature upon the kinetics of the hydrolysis reaction is generally exponential for the acidic materials preferably employed in this invention, increasing the temperature of the solution rapidly by contact with the high temperature reservoir environment will likewise rapidly form a well agglutinated viscous plug, usually at a distance less than about 20 feet from the well. In the preferred embodiment, when the pH is decreased to about 9.2 or below, the aluminum in an aluminate cross-linking agent is released as a trivalent cation capable of functioning as a cross-linking agent for the polymers of this invention.

The order of mixing of the ingredients of the treating solution is not critical as long as the mixing of the alkaline material is not unduly delayed following contact of the polymer with the cross-linking agent. The alkaline and acidic materials can be added to water, followed by the aluminate or other cross-linking agent and finally the polymer. However, the acidic material is preferably dissolved into a solution prepared by adding the alkaline material to water, followed by the aluminate and finally the polymer. The treating solution without the acidic additive is usually employed in an amount of about 2 to 800 barrels per vertical foot of strata to be treated. However, the treating solution employed in combination with the acidic additive is usually employed in an amount of about 2 to 200 barrels per vertical foot of strata to be treated.

Once the treating solution has been positioned into the reservoir, it should be allowed to gel without dilution by subsequently injected or subsequently produced fluids until the desired reduction in permeability has been achieved. Depending upon the concentrations of the components of the treating fluid and the conditions of the reservoir, the desired reduction in permeability can occur almost immediately after injection of the treating fluid has been terminated or up to several days thereafter. Successful reduction in permeability will be detected by a corresponding rise in the injection pressure of the reservoir.

The invention is further illustrated by the following examples which are illustrative of various aspects of the invention and are not intended as limiting the scope of the invention as defined by the appended claims.

EXAMPLE 1

A series of tests was made to determine the effect of pH on the gelling of polymer solutions containing a cross-linking agent. A stock solution of polymer was prepared by mixing into 400 milliliters of water about 6 milliliters of Cyanatrol 960-S, containing 30 percent by weight active solution of a 28 percent hydrolyzed polyacrylamide polymer having a molecular weight of about 15 million, marketed by American Cyanamid Company of Wallingford, Conn. This resulted in a solution containing 0.45 percent by weight active polymer. Twenty-five milliliter aliquots of this polymer solution were placed in each of a first series of 2-ounce jars, numbered 1 to 11, along with various amounts of an aqueous solution of hydrochloric acid to form a first series of solutions having a pH varying from 6.72 to 8.33 as shown in Table I. A stock solution of sodium hydroxide was prepared by mixing 2.5 grams of sodium hydroxide in 250 milliliters of water. In a second series of 2-ounce jars, numbers 12 to 22, there was mixed 0.025 grams sodium aluminate cross-linking agent and various amounts of both water and the stock sodium hydroxide solution to form a second series of solutions having a pH varying from 9.65 to 12.80 as shown in Table II. The contents of each aliquot of polymer-containing solution were then mixed with the contents of a sodium aluminate- and sodium hydroxide-containing aliquot of solution to form a series of solutions, Samples 1 to 11, containing polymer, cross-linking agent and alkaline material having varying pH. The mixtures were observed for gel formation as evidence of cross-linking. The results of the mixing are summarized in Table III.

At a final pH above about 9.2, the solutions remained clear with no gel formation. At a final pH below about 9.2, a gel formed immediately, indicating cross-linking of the polymer occurs. The only exception to this discovery was with respect to Sample 5 contained in jar 12, which had a final pH below 9.2, i.e., 9.14, but remained ungelled. This anomaly is due to the initial pH of the solution in jar 12, which was only 9.65 in contrast to jars 13 to 22, which all had an initial pH above 10.0.

These data indicate that, when sodium aluminate or other aluminates are used as the cross-linking agent, sufficient alkaline material must be present to provide an initial pH of about 10.0 or more, so that the trivalent aluminum cation is released from the aluminate to function as a cross-linking agent when the pH drops below about 9.2 due to the effects of elevated temperature on the acid material. After four days' storage at room temperature, the samples in which no gel forms initially remain clear and the samples in which a gel forms initially remain gelled.

TABLE I

POLYMER-CONTAINING SOLUTIONS

| Jar Number | Amount Aqueous Solution of Hydrochloric Acid (milliliters) | Total Volume (milliliters) | pH |
|---|---|---|---|
| 1 | 0 | 25.0 | 8.33 |
| 2 | 4.0* | 29.0 | 7.85 |
| 3 | 5.5** | 30.5 | 7.95 |
| 4 | 9.0** | 34.0 | 7.75 |
| 5 | 13.0* | 38.0 | 7.02 |
| 6 | 13.0* | 38.0 | 6.72 |
| 7 | 18.5** | 43.5 | 7.50 |
| 8 | 18.5** | 43.5 | 7.25 |
| 9 | 20.0* | 45.0 | 6.75 |
| 10 | 20.0* | 45.0 | 6.9 |
| 11 | 25.0** | 50.0 | 7.50 |

*Aqueous solution of hydrochloric acid contains 13 drops of a 38 percent by weight aqueous solution of hydrochloric acid in 100 milliliters of water.
**Aqueous solution of hydrochloric acid contains 8 drops of a 38 percent by weight aqueous solution of hydrochloric acid in 100 milliliters of water.

TABLE II

CROSS-LINKING AGENT - AND ALKALINE MATERIAL-CONTAINING SOLUTIONS

| Jar Number | Volume Water (milliliters) | Concentration $NaAlO_2$ (% by weight) | Volume Aqueous Solution of NaOH (milliliters) | Total Volume (milliliters) | pH |
|---|---|---|---|---|---|
| 1 | 19.0 | 0.128 | 0.5 | 19.5 | 9.65 |
| 13 | 11.5 | 0.208 | 0.5 | 12 | 10.03 |
| 14 | 11.0 | 0.208 | 1.0 | 12 | 10.08 |
| 15 | 19.0 | 0.119 | 2.0 | 21 | 10.08 |
| 16 | 6.0 | 0.385 | 0.5 | 6.5 | 10.34 |
| 17 | 14.0 | 0.156 | 2.0 | 16 | 10.49 |
| 18 | 4.5 | 0.50 | 0.5 | 5 | 10.56 |
| 19 | 20.5 | 0.10 | 4.5 | 25 | 11.56 |
| 20 | 0 | 0.385 | 6.5 | 6.5 | 12.68 |
| 21 | 0 | 0.50 | 5.0 | 5.0 | 12.75 |
| 22 | 0 | 2.5 | 1.0 | 1.0 | 12.80 |

TABLE III

AQUEOUS SOLUTIONS CONTAINING POLYMER, CROSS-LINKING AGENT AND ALKALINE MATERIAL

| Example Number | Mixture of Jars Numbered | Total Volume (milliliters) | Final pH | Visual Appearance |
|---|---|---|---|---|
| 1 | 6 and 14 | 50 | 9.10 | gel formed |
| 2 | 9 and 18 | 50 | 9.10 | gel formed |
| 3 | 7 and 16 | 50 | 9.12 | gel formed |
| 4 | 11 and 22 | 51 | 9.14 | gel formed |
| 5 | 3 and 12 | 50 | 9.14 | ungelled |
| 6 | 5 and 13 | 50 | 9.16 | gel formed |
| 7 | 2 and 15 | 50 | 9.42 | ungelled |
| 8 | 4 and 17 | 50 | 9.51 | ungelled |
| 9 | 1 and 19 | 50 | 9.84 | ungelled |
| 10 | 8 and 20 | 50 | 10.14 | ungelled |
| 11 | 10 and 21 | 50 | 10.86 | ungelled |

EXAMPLE 2

Permeability reduction in a sand-packed column was investigated under conditions wherein the pH of an injected polymer-containing solution remained above about 9 throughout the investigation and should not reduce permeability significantly. A 21-foot-long section of Schedule 40 steel pipe having a 2-inch inside diameter is packed with Nevada 130 sand having a particle size range from about 100 to 270 mesh (U.S. Standard Sieve Series). Four inches of Nevada 47 mesh sand was packed on both ends of the Nevada 130 sand column and a 100-mesh wire screen was positioned at each end of the column to prevent shifting of the sand. The pipe was tapped with eight pressure gauges spaced 30 inches apart along its length. The pipe was wrapped with two 24-foot-long heating tapes each controlled by a temperature controller having a thermocouple placed between the heating tape and the pipe. A third thermocouple going through one of the pressure taps was embedded in the sand to determine the actual temperature inside the pipe. The pipe was wrapped with a 3-inch layer of fiberglass insulation to reduce heat loss.

The pipe was evacuated of air by pulling a vacuum on the outlet and closing the inlet. After one hour, the inlet was opened and carbon dioxide gas flowed through the pipe for ten minutes to further the evacuation of air. The pipe was reevacuated and the contents were saturated with water. The pore volume was determined. A solution having a pH of 12.85 was made by dissolving 5 grams of sodium hydroxide in 1,000 milliliters water. The resulting solution was placed in a 1,100 milliliter pressure vessel. A polymer solution was prepared by mixing 20.8 milliliters Cyanatrol 960-S, the partially hydrolyzed polyacrylamide polymer described in Example 1, in 1,250 milliliters water. An aqueous solution containing both a cross-linking agent and an alkaline material was prepared by mixing 12.5 grams of sodium hydroxide and 2.5 grams of sodium aluminate with 1,250 milliliters water. The polymer solution and the aqueous solution containing a cross-linking agent and alkaline material were mixed together and placed in a 3,000-milliliter pressure vessel.

The sand column was maintained at 150° F. and the following fluids were sequentially injected into the column:

1. Over an 8-hour period at 60 p.s.i.g., there was injected 500 milliliters of the aqueous solution of sodium hydroxide followed by 1,700 milliliters of the aqueous solution containing polymer, cross-linking agent and alkaline material, followed by 200 milliliters of the aqueous solution of sodium hydroxide.

2. The test is shut down for 16 hours.

3. Over a 24-hour period at 60 p.s.i.g., there was injected 775 milliliters of the aqueous solution containing polymer, cross-linking agent and alkaline material.

4. Over an 8-hour period at 60 p.s.i.g., there was injected 175 milliliters of the aqueous solution of sodium hydroxide followed by 500 milliliters of water.

5. The pressure was lowered to 20 p.s.i.g. and 950 milliliters of water are injected over a 16-hour period.

6. The pressure was raised to 50 p.s.i.g. and 750 milliliters of water were injected over an 8-hour period.

7. The pressure was lowered to 5 p.s.i.g. and 600 milliliters of water were injected over a 16-hour period while samples of the effluent were periodically collected.

8. The pressure was raised to 50 p.s.i.g. and 875 milliliters of water were injected over an 8-hour period while samples of the effluent taken continuously.

Examination of the effluents shows that the aqueous solution containing polymer, cross-linking agent and alkaline material retains its high pH of about 12 after passing through the column and moves through the column without cross-linking. This indicates that, as long as the polymer solution remains at a high pH, it can be moved a considerable distance through a porous medium.

A comparison of the flow rates of water through the sand-packed column before and after the injection of the fluids described in this Example shows that the flow rate is decreased by a factor of 60. This reduction of flow rate is believed to be due to the resistance of the polymer only.

Carbon dioxide was bubbled through several samples of the effluent from the column which contain an aqueous solution of polymer, cross-linking agent and alkaline material and has a pH of at least 12. It is found that when the pH is lowered to about 9 by the carbon dioxide, a gel forms indicating that the polymer is cross-linked.

EXAMPLE 3

Using the same apparatus described in Example 2 above and the same type of sand-packed column as well as the same procedures for evacuation of air and saturating the column with water, an additional test is made using a lower concentration of sodium hydroxide in the system. In this Example, the pH of an injected polymer-containing solution should fall below about 9 during the test and a gel should form, causing a significant reduction in permeability. A first aqueous solution of an alkaline material and a cross-linking agent was prepared by admixing 0.6 grams of sodium hydroxide and 0.3 grams of sodium aluminate in 300 milliliters of water. The resulting solution had a pH of 12.24 and contained 0.2 percent by weight sodium hydroxide and 0.1 percent by weight sodium aluminate. A second aqueous solution of an alkaline material and a cross-linking agent was prepared by admixing 2.8 grams of sodium hydroxide and 1.4 grams of sodium aluminate in 700 milliliters of water. An aqueous polymer solution was prepared by admixing 12 milliliters of Cyanatrol 960-S partially hydrolyzed polyacrylamide polymer and 700 milliliters of water. The second aqueous solution of an alkaline material and a cross-linking agent was then admixed with the polymer solution to form a solution having a pH of 11.32 and containing 0.25 percent by weight of Cyanatrol 960-S, 0.2 percent by weight of sodium hydroxide and 0.1 percent by weight of sodium aluminate.

The sand-packed column was heated to 150° F. and the following fluids are sequentially injected therein:

1. Over a period of 48 hours and at an injection pressure of 5 p.s.i.g., there is injected 200 milliliters of the first aqueous solution of an alkaline material and a cross-linking agent followed by 1,355 milliliters of the aqueous solution containing a polymer, an alkaline material and a cross-linking agent, followed by 50 milliliters of the first aqueous solution of an alkaline material and a cross-linking agent.

2. Over a period of 24 hours, there is injected 750 milliliters of a second batch of the aqueous solution containing a polymer, an alkaline material and a cross-linking agent. The injection pressure for the first 8 hours is 35 p.s.i.g. after which the injection pressure is lowered to 10 p.s.i.g. At the end of the 24-hour period, the flow rate is 0.1 milliliter per minute or 0.65 foot per day.

3. Over a period of 24 hours and at an injection pressure of 35 p.s.i.g., there is injected 400 milliliters of water containing 0.1 percent by weight of ammonium thiocyanate as a tracer.

4. Over a period of 96 hours, there is injected 1,500 milliliters of water containing 0.1 percent by weight of ammonium thiocyanate. For the first 8 hours, an injection pressure of 10 p.s.i.g. is used. For the remainder of the period, the pressure is lowered to 5 p.s.i.g. At a pressure of 5 p.s.i.g., the flow rate through the core is 0.06 milliliter per minute or 0.39 foot per day.

5. Over a period of 70 hours and at an injection pressure of 5 p.s.i.g., there is injected 646 milliliters of water containing 0.1 percent by weight of ammonium thiocyanate. The flow rate is 0.04 milliliter per minute or 0.26 foot per day.

6. Just prior to shutting down over a period of 2 hours and at an injection pressure of 30 p.s.i.g., there is injected 54 milliliters of water containing 0.1 percent by weight of ammonium thiocyanate. The flow rate is 0.45 milliliter per minute or 2.93 feet per day.

When the volume of fluids injected into the test apparatus indicates that polymer should be present in the effluent, samples of the effluent are periodically taken and examined. When polymer first appears, the pH of the effluent is 8.69. This is below the pH at which a plug will begin to form. When carbon dioxide is bubbled through the polymer-containing effluent to lower the pH still further, the sample remains ungelled. This indicates that no cross-linking agent is present in the effluent. The readings on the pressure gauges indicate that some plugging occurs. The pressure in p.s.i.g. along the sand-packed column from the injection end to the outlet end is 30 at gauges 1 to 3, 25 at gauge 4, 20 at gauge 5, 15 at gauge 6, and 0 at gauges 7 and 8. The greatest pressure drop, which occurs between gauges 6 and 7, indicates the location of the principal plug. Thus, the plug forms between 15 and 17.5 feet from the injection end of the 21-foot-long pipe.

Since the pH of the polymer-containing solution is 11.32 when injected, the pH of the effluent gradually increases from 8.69 to 9.84 at the end of the test. No sodium thiocyanate tracer is produced during this test. This indicates that there is no appreciable channeling of fluids through the test apparatus.

A determination of the flow rate of water through the sand-packed column before and after the injection of the fluids described in this Example shows that the flow rate is decreased by a factor of 375. To form a firmer plug, it would be necessary to decrease the concentration of alkaline material still further.

EXAMPLE 4

The effect of temperature is investigated upon the pH of an aqueous solution containing polymer, a cross-linking agent, a temperature-activated acidic material and an alkaline material.

A stock solution of polymer is prepared by mixing together in a 600-milliliter gram beaker 3.33 grams of a 30-percent active emulsion of partially hydrolyzed polyacrylamide, Cyanamid 960 polymer, marketed by American Cyanamid Company of Wallingford, Conn., into 250 milliliters of an aqueous solution containing 0.166 gram of calcium chloride, 0.887 gram of sodium sulphate, 3.3 grams of sodium bicarbonate, 0.071 gram of magnesium chloride, and 2.4 grams of sodium chloride dissolved into sufficient water to form 3 liters of solution. The polymer-containing solution was stirred for 3 hours by a mixer having a marine impeller at the highest possible speed at which splashing could be avoided. The beaker was also baffled to improve mixing.

In a second glass beaker having a capacity of 400 milliliters, 0.5 gram of sodium hydroxide was mixed into 250 milliliters of the above-described aqueous solution using the mixer described above. When the sodium hydroxide was completely dissolved by mixing, 0.94 gram of liquid sodium aluminate containing 40.5% by weight of active sodium aluminate was stirred into the solution. Then the aluminate-containing solution was mixed into the polymer-containing solution already prepared in the 600 milliliter glass beaker. Admixture of the two solutions should yield 500 milliliters of a solution having 2,000 ppmw polymer, 1,000 ppmw sodium hydroxide, and 250 ppmw aluminum. Thirteen milliliter aliquots of the final solution are placed into each of a series of four 2-ounce capped polyethylene bottles. An aliquot of ten drops of ethyl acetate ester was introduced into two of the bottles. One bottle containing ethyl acetate ester and one bottle containing no ester were heated to 150 degrees Fahrenheit and maintained at that temperature using a Stabil-Therm heater manufactured by Blue M Electric Company. The pH of the solutions in each of the four bottles was monitored over a period of five days. The results recorded in Table IV indicate that the pH of the solution containing no ester, Samples 12 and 14, remained relatively constant over the period of five days whether subjected to the elevated temperature of 150° F. or not. By comparison, samples 13 and 15, containing ethyl acetate ester, show accelerated reduction in pH. While Sample 13 shows the accelerating effect upon gelation of the presence of the additive at any temperature, Sample 15 demonstrates that the accelerating effect is substantially increased by elevated temperature.

TABLE IV

| | Room Temperature | | Elevated Temperature | |
|---|---|---|---|---|
| | 12 | 13 | 14 | 15 |
| Sample No.[a] | Without Acidic | With Acidic | Without Acidic | With Acidic |
| pH Concentration[b] | Material | Material | Material | Material |
| Day 1 | 10.5 | 10.0 | 10.5 | 10.0 |
| Day 2 | 10.4 | 8.8 | 10.4 | 6.8 |
| Day 3 | 10.0 | 6.8 | 10.0 | 5.8 |

[a]Each sample contains 0.2% American Cyanamid 960 polymer, 0.1% sodium hydroxide, and 0.025% aluminum, by weight. Samples 13 and 15 contain 0.58% by weight of ethyl acetate ester.
[b]Initial pH of all samples was 10.5.

EXAMPLE 5

An investigation of the effect upon pH with time of a temperature-activated acidic material present in the polymer-containing solution was conducted. Comparison is made with a like solution containing no acidic material. An aqueous solution of polymer, caustic and aluminate was prepared using the method described in Example 4. In a 400 milliliter beaker, 3.33 grams of American Cyanamid 960 polymer and 0.25 grams of sodium hydroxide were mixed into 250 milliliters of water. In a second beaker, 0.25 gram of sodium hydroxide and 0.752 gram of liquid sodium aluminate having 13.3 percent active aluminum were dissolved in 250 milliliters of water and then stirred into the contents of the first beaker to make a solution containing polymer, alkali and aluminate. To 100 milliliters of this stock solution was added 0.89 gram of ethyl acetate ester. The resulting solution was 890 ppmw of ethyl acetate ester, 1,000 ppmw of sodium hydroxide, 2,000 ppmw of polymer, and 200 ppmw of aluminum. Two 2-ounce polyethylene bottles were filled with 13 milliliters each of the ester-containing solution of the stock solution to make Samples 16 and 17, respectively. Using a Beckman model 3500 digital pH meter, pH readings were recorded over a period of 66 hours at room temperature. The results summarized in Table V show the rapid reduction in pH achieved by addition of the ester even at room temperature. Since the rate of the hydrolysis reaction depends upon temperature, and since room temperature is the most conservative case, it can be assumed that at the higher temperatures encountered within the reservoir, the reduction of pH will be accelerated over that at room temperature. It should be noted that, even in the absence of elevated temperature, the pH of the ester-containing solution, Sample 16, had dropped to 9.57 within 3 hours and reached 9.2, the pH at which cross-linking occurs, within a few hours thereafter. By contrast, the pH of Sample 17 containing the stock solution remained relatively constant.

TABLE V

| Time | pH (Sample 16) (Sample contains 0.89 wt. percent Ethyl acetate ester) | pH (Sample 17) (Sample contains no acidic material) |
|---|---|---|
| 0 (min.) | 11.77 | 11.77 |
| 3 | 11.17 | 11.77 |
| 6 | 10.55 | 11.77 |
| 10 | 10.3 | 11.77 |
| 12 | 10.19 | 11.76 |
| 18 | 10.0 | 11.76 |

TABLE V-continued

| Time | pH (Sample 16) (Sample contains 0.89 wt. percent Ethyl acetate ester) | pH (Sample 17) (Sample contains no acidic material) |
| --- | --- | --- |
| 21 | 9.93 | 11.76 |
| 60 | 9.79 | 11.75 |
| 105 | 9.7 | 11.75 |
| 120 | 9.66 | 11.74 |
| 180 | 9.57 | 11.73 |
| 28 (hr.) | 7.67 | 11.73 |
| 66 | 7.43 | 11.73 |

EXAMPLE 6

An investigation of permeability reduction resulting from addition of acidic material to a solution containing polymer, alkaline and aluminate was conducted in parallel tests in sandpack. A lucite tube having a length of 68.8 centimeters, a diameter of 3.81 centimeters, and a cross-sectional area of 11.4 square centimeters was packed with Nevada 130 sand having a particle range from about 100 to about 270 mesh (U.S. Standard Sieve Series). On each end of the column, one inch of Nevada 47 mesh sand was packed with an aloxite disc positioned at the extreme end to prevent shifting or spillage of the sand from the column.

The packed sand column was evacuated of air by pulling a vacuum of 25 inches of mercury on the outlet and closing the inlet. After two hours the inlet was opened and the tube was then saturated with the synthetic water solution described above which was drawn from a 500-milliliter beaker and the pore volume was calculated by difference. A preflush solution was prepared by dissolving 0.05 gram of sodium hydroxide and 0.15 gram of the liquid sodium aluminate in a beaker containing 100 milliliters of water. The resulting solution, containing 500 ppmw of sodium hydroxide and 200 ppmw of aluminum, was placed into a 500-milliliter pressure vessel. A polymer solution was prepared by mixing 3.33 grams of American Cyanamid 960, the partially hydrolyzed polyacrylamide polymer described above, in 250 milliliters of water. An aqueous solution containing both a cross-linking agent and an alkaline material was prepared by mixing 0.25 gram of sodium hydroxide and 0.752 gram of sodium aluminate with 250 milliliters of water. The polymer solution and the aqueous solution containing a cross-linking agent and alkaline material were mixed together and placed in a 1000 milliliter pressure vessel. The resulting solution contained 2,000 ppmw of American Cyanamid 960, 500 ppmw of sodium hydroxide, and 200 ppmw of aluminum.

The sandpack column was maintained at room temperature and the following fluids were sequentially injected therein:

1. At 10 p.s.i.g., 10 milliliters of the aqueous preflush solution was injected, followed by 50 milliliters of the aqueous solution containing polymer, cross-linking agent, and alkaline material, followed by 7.5 milliliters of the aqueous preflush solution, the latter being injected at 30 p.s.i.g.

2. The test was shut down for 16 hours.

3. Over a 7-hour period at 30 p.s.i.g., 450 milliliters of stock aqueous solution of synthetic water was injected.

Calculation from flow data of permeabilities through the sandpack before and after treatment shows a 15.6-fold reduction due to the injection of the polymer solution.

A parallel experiment, in which an acidic material was added to the polymer-containing solution, was conducted using a sandpack column prepared in the manner described above. The aqueous preflush solution was prepared by mixing 0.08 gram of sodium hydroxide and 0.15 gram of the liquid sodium aluminate into a 250 milliliter beaker containing 100 milliliters of water. An aqueous solution of polymer, alkaline material, cross-linking agent, and acidic material was prepared as above by stirring 3.33 grams of American Cyanamid 960 polymer into 250 milliliters of water. In a second beaker, 0.512 gram of sodium hydroxide and 0.752 gram of the liquid sodium aluminate were dissolved in 250 milliliters of water and then stirred into the contents of the first beaker. Then 3.75 grams of ethyl acetate was added. The resulting solution contained 2,000 ppmw of polymer, 1,024 ppmw of sodium hydroxide, 200 ppmw of aluminum, and 7,500 ppmw of ethyl acetate ester.

The sandpack column was maintained at room temperature and the following fluids were sequentially injected therein:

1. At 30 p.s.i.g., 11 milliliters of the aqueous preflush solution was injected followed by 50 milliliters of the aqueous solution containing polymer, cross-linking agent, alkaline material, and acidic material, followed by 4 milliliters of the aqueous preflush solution.

2. The test was shut down for 21 hours.

3. Over a 10.4-hour period, at 30 p.s.i.g., 563 milliliters of stock synthetic water were injected.

Calculation from flow data of permeabilities before and after treatment shows an 80-fold reduction in permeability due to injection of the polymer solution containing the additive acidic material of this invention. Under conditions of ambient temperature, therefore, permeability reduction is more than 5 times as great, when the polymer-containing solution is used in combination with the acidic additive as when no acidic additive is used. The results of these experiments are summarized in Tables VI and VII.

TABLE VI
RESULTS WITHOUT ACIDIC ADDITIVE

| Injection Pressure (p.s.i.g.) | Volume (cc) | Components (ppmw) | Injection Rate (cc/sec) |
| --- | --- | --- | --- |
|  |  | (preflush) |  |
|  | 10 | 500 NaOH 200 Al | — |
| 10 | 50 | 2,000 AM 960 500 NaOH 200 Al | 0.01 |
|  |  | (postflush) |  |
| 30 | 7.5 | 500 NaOH 200 Al | 0.0052 |
|  |  | Shut-in 64 Hours |  |
| 30 | 450 | Synthetic Water | .09 |

Porosity = 0.383
Pore Volume = 300 cc.
Original permeability = 4145 md
Final permeability = 266 md

TABLE VII
RESULTS WITH ACIDIC ADDITIVE

| Injection Pressure (p.s.i.g.) | Volume (cc) | Components (ppmw) | Injection Rate (cc/sec) |
| --- | --- | --- | --- |
|  |  | (preflush) |  |
| 10 | 10 | 800 NaOH | — |

TABLE VII-continued
RESULTS WITH ACIDIC ADDITIVE

| Injection Pressure (p.s.i.g.) | Volume (cc) | Components (ppmw) | Injection Rate (cc/sec) |
|---|---|---|---|
| 30 | 50 | 200 Al<br>1024 NaOH | 0.25 |
| | | 200 Al<br>2000 AC 960<br>7500 EtAc Ester<br>(postflush) | |
| 30 | 4 | 800 NaOH<br>200 Al | 0.001 |
| | | Shut-in 64 Hours | |
| 30 | 563 | Synthetic Water | .015 |

Porosity = 0.378
Pore Volume = 295 cc.
Original permeability = 3505 md
Final permeability = 44 md Although the invention has been described in conjunction with embodiments thereof, including a preferred embodiment, it is apparent that the invention is capable of many modifications, alternatives and variations. Accordingly, it is intended to embrace within the invention all such modifications, alternatives and variations as may fall within the spirit and scope of the appended claims.

We claim:

1. A method for reducing the permeability of the higher permeability zones of a subterranean reservoir having heterogenous permeability penetrated by at least one well comprising injecting through a well and into said reservoir a composition of matter comprising in an aqueous liquid (1) a water-soluble or water-dispersible polymer; (2) a crosslinking agent for the polymer capable of reacting with said polymer to produce a gel in an alkaline media; (3) a source of hydroxyl ions in an amount sufficient to retard the reaction of said polymer with said cross-linking agent; and (4) an additive capable of sufficiently reducing the pH of said aqueous liquid at an ambient elevated temperature so as to initiate or accelerate reaction of said polymer and said cross-linking agent.

2. A method for reducing the permeability of the higher permeability zones of a subterranean reservoir having heterogeneous permeability penetrated by at least one well comprising injecting through a well and into said reservoir a composition of matter comprising in an aqueous liquid (1) a water-soluble or water-dispersible polymer; (2) a crosslinking agent for the polymer capable of reacting with said polymer to produce a gel in an alkaline media; (3) an alkaline material in an amount sufficient to retard the reaction of said polymer with said cross-linking agent; and (4) an additive capable of sufficiently reducing the pH of said aqueous liquid at an elevated temperature so as to accelerate reaction of said polymer and said cross-linking agent at the elevated temperature.

3. A method for reducing the permeability of the higher permeable zones of a subterranean reservoir having heterogeneous permeability penetrated by at least one well comprising injecting through a well and into said reservoir a composition of matter comprising in an aqueous liquid (1) a water-soluble or water-dispersible polymer; (2) a crosslinking agent for the polymer capable of reacting with said polymer to produce a gel at a pH below about 9.2 but not above about 9.2; (3) an alkaline material in an amount sufficient to raise the pH of said liquid above about 10.0 in the absence of the additive hereinafter defined; and (4) an additive capable of reducing the pH of said aqueous liquid to a pH below about 9.2 to initiate gelation of said polymer and said crosslinking agent, said additive being further capable of reducing the pH at a faster rate at an elevated temperature than at ambient temperature.

4. A method for reducing the permeability of the higher permeability zones of a subterranean reservoir having heterogeneous permeability penetrated by at least one well comprising injecting through a well and into said reservoir a composition of matter comprising in an aqueous liquid (1) a water-soluble or water-dispersible polymer; (2) a crosslinking agent for the polymer capable of substantial reaction with said polymer to produce a gel only below a fixed pH above 7.0; (3) an alkaline material in an amount sufficient to raise the pH of said liquid above said fixed pH in the absence of the additive hereinafter defined; and (4) an additive capable of sufficiently reducing the pH of said aqueous liquid to a pH below the fixed pH to initiate gelation of said polymer and said cross-linking agent, said additive being further capable of reducing the pH at a faster rate at an elevated temperature than at ambient temperature.

5. A method as defined in claim 1, 2, 3, or 4 wherein said additive is capable of reducing the pH of said aqueous liquid at ambient temperature but at a faster rate at 150° F.

6. A method for reducing the permeability of the higher permeability zones of a subterranean reservoir having heterogeneous permeability penetrated by at least one well comprising injecting through a well and into said reservoir a composition for reducing the permeability zones of a subterranean reservoir having heterogeneous permeability penetrated by at least one well comprising an aqueous liquid containing (1) a water-soluble or water-dispersible polymer selected from the group consisting of acrylic acid acrylamide copolymers, polyacrylamides, partially hydrolyzed polyacrylamides, polyalkyleneoxides, carboxyalkylcelluloses, carboxyalkylhydroxyethylcelluloses, hydroxyethylcelluloses and heteropolysaccharides obtained by the fermentation of starch-derived sugar, (2) a crosslinking agent for the polymer selected from the group consisting of an alkali metal or ammonium aluminates and gallates, (3) an amount of a water-soluble alkaline material selected from the group consisting of alkali metal and ammonium hydroxides, alkali metal silicates, sodium carbonate and alkali metal phosphates sufficient to raise the pH of the overall aqueous liquid to that at which the cross-linking material is substantially unreactive with the polymer, and (4) an amount of a water-soluble temperature-activated acidic material dissolved in the aqueous liquid sufficient to lower the pH of said liquid to that at which a cross-linking reaction occurs when said liquid is subjected to an elevated temperature.

7. A method for reducing the permeability zones of a subterranean reservoir having heterogeneous permeability penetrated by at least one well comprising injecting through said well and into said reservoir an aqueous liquid containing (1) a water-soluble or water-dispersible polymer selected from the group consisting of acrylic acid acrylamide copolymers, polyacrylamides, partially hydrolyzed polyacrylamides, polyalkyleneoxides, carboxyalkylcelluloses, carboxyalkylhydroxyethylcelluloses, hydroxyethylcelluloses and heteropolysaccharides obtained by the fermentation of starch-derived sugar, (2) a cross-linking agent for the polymer selected from the group consisting of alkali metal or ammonium aluminates and gallates, (3) an amount of a water-soluble alkaline material selected from the group consisting of alkali metal and ammonium hydroxides, alkali metal silicates, alkali metal and ammonium carbonates, and alkali metal phosphates sufficient to raise the pH of the overall aqueous liquid to that at which the cross-linking material is substantially unreactive with the polymer, and (4) an amount of a water-soluble temperature-activated acidic material dissolved in the aqueous liquid sufficient to accelerate a cross-linking reaction between said polymer and said cross-linking agent when said liquid is subjected to an elevated temperature.

8. A method for reducing the permeability of the higher permeability zones of a subterranean reservoir having heterogeneous permeability penetrated by at least one well comprising injecting through a well and into said reservoir an aqueous liquid containing (1) a water-soluble or water-dispersible polymer selected from the group consisting of acrylic acid acrylamide copolymers, polyacrylamides, partially hydrolyzed polyacrylamides, polyalkyleneoxides, carboxyalkylcelluloses, carboxyalkylhydroxyethylcelluloses, hydroxyethylcelluloses and heteropolysaccharides obtained by the fermentation of starch-derived sugar, (2) a crosslinking agent for the polymer comprising a water-soluble salt of a polyvalent cation reactive for cross-linking the polymer at an alkaline pH, with said cation being contained in an unreactive anionic species, (3) an amount of water-soluble alkaline material sufficient to raise the pH of the overall aqueous liquid to a value at which said polyvalent cation exists in an anionic species essentially unreactive to said polymer, and (4) an amount of a water-soluble temperature-activated acidic material dissolved in the aqueous liquid in an amount sufficient to accelerate the lowering of the pH of said liquid to a value at which said anionic species becomes a polyvalent cation reactive for crosslinking when said liquid is subjected to an elevated temperature.

9. The method as defined in claim 6 or 8 wherein the water-soluble acidic material is selected from the group consisting of polyethylene esters, ethyl acetate esters, acrylate copolymers and a mixture of dimethyl esters comprising dimethyl succinate, dimethyl glutarate and dimethyl adipate.

10. The method defined in claim 7 or 8 wherein the acidic material is capable of reducing the pH of the aqueous liquid at ambient temperature but at a faster rate at 150° F.

11. The method as defined in claim 7 or 8 wherein the acidic material contains a mixture comprising dimethyl succinate, dimethyl glutarate and dimethyl adipate.

12. The method as defined in claim 11 wherein the mixture comprises about 10 to 25 percent by weight of dimethyl adipate, about 45 to 65 percent by weight of dimethyl glutarate and about 20 to 30 percent by weight of dimethyl succinate.

13. The method as defined in claim 12 wherein the mixture of dimethyl esters is employed in a concentration of about 0.6 to about 1.2 parts by weight of the aqueous liquid.

14. The method as defined in claim 11 wherein the mixture of dimethyl esters is employed in a concentration of about 0.08 to about 20 parts by weight of the aqueous liquid.

15. A method as defined in claim 8 wherein the water-soluble, acidic material comprises ethyl acetate ester.

16. A method as defined in claim 15 wherein said cross-linking agent comprises an alkali metal aluminate.

17. The method as defined in claim 1, 2, 3, 4, 6, 7, or 8 in which the aqueous liquid is essentially free of silicates.

18. A method for reducing the higher permeability zones of a subterranean reservoir having heterogeneous permeability penetrated by at least one well comprising injecting an aqueous liquid containing (1) a water-soluble or water-dispersible polymer selected from the group consisting of acrylic acid acrylamide copolymers, polyacrylamides, partially hydrolyzed polyacrylamides, popolyalkyleneoxides, carboxyalkylcelluloses, carboxyalkylhydroxyethylcelluloses, hydroxyethylcelluloses and heteropolysaccharides obtained by the fermentation of starch-derived sugar, (2) a crosslinking agent for the polymer comprising a water-soluble alkali metal aluminate reactive for cross-linking the polymer at an alkaline pH, (3) an amount of water-soluble alkaline material sufficient to raise the pH of the overall aqueous liquid to a value at which the crosslinking agent is substantially unreactive with the polymer, and (4) an amount of a water-soluble temperature-activated acidic material selected from the group consisting of polyethylene glycol esters, ethyl acetate esters, acrylate copolymers, and mixtures of dimethyl esters comprising dimethyl succinate, dimethyl glutarate, and dimethyl adipate dissolved in the aqueous liquid in an amount sufficient to accelerate the lowering of the pH of said liquid to a value at which said crosslinking agent becomes a polyvalent cation reactive for crosslinking when said liquid is subjected to an elevated temperature.

19. A method for reducing the permeability of the higher permeability zones of a subterranean reservoir penetrated by at least one well comprising injecting through a well and into said reservoir a composition of matter comprising in an aqueous liquid (1) a water-soluble or water-dispersible polymer; (2) a cross-linking agent comprising a water-soluble aluminate; (3) an alkaline material provided in an amount sufficient to raise the pH of said aqueous liquid above 10.0 in the absence of the additive hereinafter described; and (4) an additive comprising a mixture of dimethyl adipate, dimethyl glutarate, and dimethyl succinate.

20. A method as defined in claim 19 wherein said aluminate is sodium aluminate, said alkaline material is selected from the group consisting of alkali metal hydroxides, alkali metal phosphates, and alkali metal silicates, and said mixture is provided in a concentration of about 0.08 to about 20.0 parts by weight of the aqueous liquid, with said mixture comprising 10 to 25 percent by weight dimethyl adipate, 45 to 65 percent by weight dimethyl glutarate, and 20 to 30 percent by weight dimethyl succinate.

21. A method as defined in claim 1, 2, 3, 4, 6, 8, 15, 18, 19 or 20 wherein said composition forms a gel in said reservoir such that the closest point of said gel to the well is no greater than 20 feet from the well.

22. The method defined in claim 1, 3, 4, 6, 8, 18, 15, 19 or 20 wherein the aqueous liquid is essentially continuously injected the reservoir, and the pH of the liquid decreases during injection while the concentration of acidic material in said liquid increases, and the concentration of said cross-linking agent is lower at the end of said injection than at the commencement.

23. A method for reducing the permeability of the higher permeability zones of a subterranean reservoir having heterogeneous permeability penetrated by at least one well comprising, in the first stage, injecting through a well and into said reservoir an aqueous liquid comprising (1) a water-soluble or water-dispersible polymer selected from the group consisting of acrylic acid-acrylamide copolymers, polyalkyleneoxides, carboxyalkylcelluloses, carboxyalkylhydroxyethylcelluloses, hydroxyethylcelluloses and heteropolysaccharides obtained by the fermentation of starch-derived sugar, (2) a cross-linking agent for the polymer selected from the group consisting of an alkali metal or ammonium aluminate, tungstate, or gallate, and (3) an amount of a water-soluble alkaline material selected from the group consisting of alkali metal and ammonium hydroxides, alkali metal silicates, alkali metal and ammonium carbonates, and alkali metal phosphates sufficient to raise the pH of the overall aqueous solution or dispersion above that at which cross-linking material is substantially unreactive with the polymer, passing the said aqueous liquid through the reservoir until the pH has fallen to that at which cross-linking occurs, in the second stage, injecting through a well and into said reservoir a mixture of said aqueous liquid in combination with a sufficient amount of a temperature-activated acidic material dissolved in the aqueous liquid to accelerate the rate at which cross-linking occurs when said aqueous solution reaches reservoir temperature, passing the said aqueous liquid in combination with said acidic material into the reservoir, and allowing gelation so as to reduce the reservoir permeability.

24. The method of claim 23 wherein the alkaline material comprises alkali metal hydroxide or phosphate and the acidic material is selected from the group consisting of polyethylene glycol esters, ethyl acetate esters, acrylate copolymers and a mixture of dimethyl esters, said mixture comprising dimethyl glutarate, dimethyl adipate and dimethyl succinate.

25. The method of claim 23 wherein the alkaline material comprises an alkali metal hydroxide or phosphate, the acidic material comprises ethyl acetate ester and the cross-linking agent comprises sodium aluminate.

26. The method of claim 23 wherein the alkaline material comprises an alkali metal hydroxide or phosphate, the acidic material is a mixture of about 10 to 25 percent by weight of dimethyl adipate, about 45 to 65 percent by weight of dimethyl glutarate and about 20 to 30 percent by weight of dimethyl succinate and the cross-linking agent comprises sodium aluminate.

27. The method defined in claim 23, 24, or 26 wherein the polymer comprises a partially hydrolyzed polyacrylamide.

28. The method defined in claim 23 wherein the reduction in permeability resulting from the first stage of injection occurs about 20 feet or more away from the well and the reduction in permeability resulting from the second stage of injection occurs from near or at the well to about 20 feet from the well.

29. A method for reducing the permeability of the higher permeability zones of a subterranean reservoir having heterogeneous permeability penetrated by at least one well comprising (A) injecting through a well and into said reservoir about 2 to 800 barrels per vertical foot of reservoir to be treated of a composition comprising an aqueous solution or dispersion of (1) a water-soluble or water-dispersible polymer selected from the group consisting of acrylic acid-acrylamide copolymers, polyacrylamides, partially hydrolyzed polyacrylamides, polyalkyleneoxides, carboxyalkylcelluloses, carboxyethylhydroxyethylcellulose, hydroxyethylcelluloses and heteropolysaccharides obtained by the fermentation of starch-derived sugar, (2) a cross-linking agent reactive for the polymer selected from the group consisting of an alkali metal or ammonium aluminates and gallates, (3) an amount of a water-soluble alkaline material selected from the group consisting of alkali metal and ammonium hydroxides, alkali metal silicates, alkali metal and ammonium carbonates, and alkali metal phosphates sufficient to raise the pH of the overall aqueous solution to a value at which said cross-linking agent is substantially unreactive to the polymer, and (4) a sufficient amount of a temperature-activated water-soluble acidic material dissolved in the aqueous liquid to lower the pH of the liquid to a value at which said cross-linking agent is substantially reactive with the polymer when the solution reaches the temperature of the reservoir, (B) passing said composition into the reservoir, and (C) allowing gelation so as to reduce the reservoir permeability.

30. The method defined in claim 29 wherein the alkaline material comprises sodium hydroxide, the acidic material comprises ethyl acetate ester and the cross-linking agent comprises sodium aluminate.

31. The method defined in claim 29 wherein the alkaline material contains sodium hydroxide, the acidic material contains a mixture of dimethyl esters comprising about 10 to 25 percent of dimethyl adipate, about 45 to 65 percent of dimethyl glutarate and about 20 to 30 percent of dimethyl succinate by weight and the cross-linking agent comprises sodium aluminate.

32. The method defined in claim 29 wherein the acidic material contains a mixture of about 10 to 25 percent of dimethyl adipate, about 45 to 65 percent of dimethyl glutarate and about 20 to 30 percent of dimethyl succinate by weight.

33. A method for reducing the permeability of the higher permeability zones of a subterranean reservoir having heterogeneous permeability penetrated by at least one well comprising (A) injecting through a well and into said reservoir about 2 to 800 barrels per vertical foot of reservoir to be treated of a composition comprising an aqueous solution or dispersion of (1) a water-soluble or water-dispersible polymer selected from the group consisting of acrylic acid-acrylamide copolymers, polyacrylamides, partially hydrolyzed polyacrylamides, polyalkyleneoxides, carboxyalkylcelluloses, carboxyethylhydroxyethylcellulose, hydrooxyethylcelluloses and heteropolysaccharides obtained by the fermentation of starch-derived sugar, (2) a cross-linking agent reactive for the polymer selected from the group consisting of an alkali metal or ammonium aluminates, tungstates, and gallates, (3) an amount of a water-soluble alkaline material sufficient to raise the pH of the overall aqueous solution to a value at which said cross-linking agent is substantially unreactive to the polymer, and (4) a sufficient amount of an acidic material selected from the group consisting of polyethylene glycol esters, ethyl acetate esters, acrylate copolymers and a mixture of dimethyl adipate, dimethyl glutarate and dimethyl succinate dissolved in the aqueous liquid to lower the pH of the liquid to a valve at which said cross-linking agent is substantially reactive with the polymer when the solution reaches the temperature of the reservoir, (B) passing said composition into the reservoir, and (C)

allowing gelation so as to reduce the reservoir permeability.

34. The method defined in claim 33 wherein the alkaline material is employed in a concentration of about 0.025 to 0.5 part by weight, the acidic material is employed in a concentration of about 0.05 to about 20 parts by weight and the cross-linking agent is employed in a concentration of 0.0005 to 1 part weight of the aqueous solution or dispersion.

35. The method for reducing the permeability of the higher permeability zones of a subterranean reservoir having heterogeneous permeability penetrated by at least one well, said reduction in permeability occurring at or nearby the well to about 20 feet from the well, comprising injecting through the well and into said reservoir an aqueous solution or dispersion comprising (1) about 0.0025 to 1 part by weight of a water-soluble or water-dispersible polyacrylamide or partially hydrolyzed polyacrylamide, (2) about 0.0005 to 1 part by weight of an alkali metal or ammonium aluminate cross-linking agent, and (3) an amount of sodium hydroxide or a sodium phosphate sufficient to raise the pH of the overall aqueous solution or dispersion to that at which the crosslinking agent is substantially unreactive with the polymer, and (4) an amount of a temperature activated acidic material comprising a mixture of dimethyl glutarate, dimethyl adipate and dimethyl succinate sufficient to lower the pH of the overall aqueous solution or dispersion at 150° F. to that at which a cross-linking reaction occurs.

36. The method defined in claim 35 wherein the cross-linking agent comprises sodium aluminate employed in a concentration of about 0.0005 to 1 part by weight, and the acidic material is employed in a concentration of about 0.05 to 20 parts by weight of the aqueous solution or dispersion.

37. The method defined in claim 35 wherein the acidic material contains a mixture of dimethyl esters comprising about 10 to 25 percent by weight of dimethyl adipate, about 45 to 65 percent by weight of dimethyl glutarate and about 20 to 30 percent by weight of dimethyl succinate.

38. The method defined in claim 37 wherein the cross-linking material is sodium aluminate.

39. The method defined in claim 35 wherein the alkaline material is sodium hydroxide and is in an amount sufficient to raise the pH of the overall solution above about 10, the cross-linking agent comprises sodium aluminate and the acidic material is used in an amount sufficient to lower the pH of the overall solution below about 9 at 150° F.

40. The method defined in claim 37 or 39 wherein the polymer is a partially hydrolyzed polyacrylamide.

41. The method defined in claim 29, 36, 37, or 39 wherein the aqueous liquid is essentially continuously injected into the reservoir, and the pH of the liquid decreases during injection while the concentration of acidic material in said liquid increases, and the concentration of said crosslinking agent is lower at the end of said injection that at the commencement.

42. The method defined in claim 41 wherein the polymer comprises a partially hydrolyzed polyacrylaminde.

43. The method as defined in claim 1, 3, 4, 6, 8, 18, 15, 19, 20, 21, 27, or 33 in which the aqueous liquid is essentially free of alkali metal silicates.

44. In a method for the recovery of oil from a subterranean oil reservoir having strata of heterogeneous permeability and being in communication with at least one producing well and at least one injection well, which method includes injection into the reservoir of a secondary or a tertiary recovery fluid via an injection well and recovery of oil via a production well, the improvement which comprises, at some point during the injection of the secondary or tertiary recovery fluid introducing into the heterogeneous reservoir an aqueous solution or dispersion containing (1) about 0.02 to 0.5 part by weight of a partially hydrolyzed polyacrylamide, (2) about 0.0030 to 0.2 part by weight of sodium aluminate cross-linking agent, (3) about 0.025 to 0.5 part by weight of sodium hydroxide, and (4) a temperature activated acidic material comprising an ethyl acetate ester or a mixture of dimethyl glutarate, dimethyl adipate and dimethyl succinate, the aqueous solution passing into the reservoir so that the pH of the solution falls to about 9 or below due to contact with the elevated temperature encountered within the reservoir.

45. The method defined in claim 44 wherein the aqueous solution is injected in a series of slugs and the concentration of sodium aluminate is greater in the first slug than in any other while the concentration of the sodium hydroxide decreases in each successive slug and the concentration of the acidic material is substantially zero in the first slug and increases thereafter in each successive slug.

46. The method defined in claim 45 wherein said acidic material comprises a mixture containing about 10 to 25 percent of dimethyl adipate, about 45 to 65 percent of dimethyl glutarate and about 20 to 30 percent by weight of dimethyl succinate said mixture being in a concentration of 0.6 to 1.2 parts by weight of said solution.

47. The method defined in claim 45 wherein there are five successive slugs of aqueous solution and the compositions of the aqueous slugs fall within the following ranges:

| Slug No. | Polymer (ppmw) | Aluminum Ion (ppmw) | Alkaline Component (ppmw) | Acidic Component (ppmw) |
|---|---|---|---|---|
| 1 | 1500–2500 | 100–200 | 750–1000 | 0.01–10 |
| 2 | 1500–2500 | 95–150 | 700–850 | 80–120 |
| 3 | 1500–2500 | 95–150 | 650–750 | 400–3000 |
| 4 | 1500–2500 | 95–150 | 600–700 | 4500–5500 |
| 5 | 1500–4000 | 95–150 | 500–600 | 6000–12000 |

48. The method defined in claim 44 wherein the aqueous solution is injected continuously and the concentration of the sodium aluminate during injection is decreased from the initial concentration, and thereafter held at an essentially constant value, while the concentration of the sodium hydroxide decreases continuously and the acidic material comprises ethyl acetate ester, the concentration of which initially is substantially zero and is increased continuously thereafter.

* * * * *

UNITED STATES PATENT OFFICE
CERTIFICATE OF CORRECTION

Patent No. 4,534,412          Dated August 13, 1985

Inventor(s) Hoai T. Dovan and Richard D. Hutchins

It is certified that error appears in the above-identified patent and that said Letters Patent are hereby corrected as shown below:

Column 21, line 40, (claim 1) after "ambient" insert -- or --.

Column 23, line 45, (claim 9) after "polyethylene" insert -- glycol --.

Signed and Sealed this

Tenth Day of December 1985

[SEAL]

Attest:

Attesting Officer

DONALD J. QUIGG

Commissioner of Patents and Trademarks